United States Patent
Grötsch et al.

(10) Patent No.: US 11,069,455 B2
(45) Date of Patent: Jul. 20, 2021

(54) COMPOSITION FOR PRODUCING AN ELECTRICALLY CONDUCTIVE LAYER, IN PARTICULAR FOR AN ELECTROLUMINESCENCE DEVICE

(71) Applicant: InovisCoat GmbH, Monheim am Rhein (DE)

(72) Inventors: Georg Grötsch, Mühldorf am Inn (DE); Rudolf Schmidt, Cologne (DE); Tobias Tschorn, Düsseldorf (DE)

(73) Assignee: InovisCoat GmbH, Monheim am Rhein (DE)

( * ) Notice: Subject to any disclaimer, the term of this patent is extended or adjusted under 35 U.S.C. 154(b) by 0 days.

(21) Appl. No.: 16/767,964

(22) PCT Filed: Nov. 12, 2018

(86) PCT No.: PCT/EP2018/080953
§ 371 (c)(1),
(2) Date: May 28, 2020

(87) PCT Pub. No.: WO2019/105726
PCT Pub. Date: Jun. 6, 2019

(65) Prior Publication Data
US 2020/0350092 A1 Nov. 5, 2020

(30) Foreign Application Priority Data
Nov. 29, 2017 (EP) ..................... 17204479

(51) Int. Cl.
*H01B 1/22* (2006.01)
*C09D 5/24* (2006.01)
*H01B 1/24* (2006.01)
*H05B 33/26* (2006.01)

(52) U.S. Cl.
CPC ................. *H01B 1/24* (2013.01); *C09D 5/24* (2013.01); *H01B 1/22* (2013.01); *H05B 33/26* (2013.01)

(58) Field of Classification Search
CPC ... H01B 1/00; H01B 1/22; H01B 1/24; H05B 33/26; B05D 5/12; C09D 5/24
See application file for complete search history.

(56) References Cited

U.S. PATENT DOCUMENTS

| 10,072,159 B2* | 9/2018 | Diehl ................ C08L 67/02 |
| 2007/0160833 A1* | 7/2007 | Maak ............... C08L 2666/02 428/343 |
| 2007/0292705 A1* | 12/2007 | Moncla ............. C08J 7/0427 428/523 |
| 2010/0209599 A1* | 8/2010 | Van Veen ............ H01B 1/22 427/126.1 |
| 2012/0205595 A1* | 8/2012 | Schulz-Dobrick .... H01M 4/525 252/507 |
| 2017/0207448 A1* | 7/2017 | Fanous ............. H01M 4/137 |

OTHER PUBLICATIONS

International Preliminary Report on Patentability of PCT/EP2018/080953 dated Jun. 2, 2020, 6 pages.
Written Opinion and International Search Report of PCT/EP2018/080953 dated Jan. 21, 2019, 11 pages (English and German).

* cited by examiner

*Primary Examiner* — Mark Kopec
(74) *Attorney, Agent, or Firm* — Rankin, Hill & Clark LLP

(57) ABSTRACT

A composition for producing an electrically conductive layer according to a slotted-nozzle method includes 2-30 wt. % of a protective colloid mixture which is soluble or dispersible in water, 1-15 wt. % of a conductive carbon modification, 5-50 wt. % of metal-coated particles, 50-90 wt. % of an aqueous solvent, the dynamic viscosity of the conductive composition being less than 400 mPa·s, wherein the composition comprises 0.1-10 wt. % of an ethylene-vinyl acetate copolymer. The electrically conductive layer being one or both of a pair of conductive layers having a luminous layer with electroluminescent pigments arranged therebetween in an electroluminescense device or related method for producing an electroluminescense device.

19 Claims, No Drawings

COMPOSITION FOR PRODUCING AN ELECTRICALLY CONDUCTIVE LAYER, IN PARTICULAR FOR AN ELECTROLUMINESCENCE DEVICE

BACKGROUND

The present disclosure relates to a composition for producing an electrically conductive layer according to a slotted-nozzle method, to a method for producing an electroluminescence device based on the above-mentioned composition and to an electroluminescence device per se.

Electroluminescence refers to the emission of light from chemical substances that are brought into an electric field. The electrical field is generated between two conductive layers, the electrodes, by means of alternating voltage. The light-emitting chemicals are embedded in a dielectric between the two electrodes. So that the light can leave the system, at least one of these two electrodes must enable light transmission, this electrode being routinely referred to as the front electrode. The second conductive layer is usually not transparent and is routinely referred to as the back electrode. In addition to the three layers mentioned above, auxiliary layers are usually also present, which ensure stable construction and operation of an electroluminescence device.

In known electroluminescence devices, the luminance still routinely constitutes a problem, i.e. the amount of light emitted by the electroluminescence device is not sufficient to use a conventional electroluminescence device, in particular for those applications in which a high luminosity is required. In order to achieve a high luminance in an electroluminescence device, it is necessary for at least one of the electrodes, usually the back electrode, to conduct current very well, i.e. to have a low sheet resistance. Since electroluminescence devices are layer arrangements, it is simultaneously necessary for the current-conducting layer, i.e. the back electrode, to be able to be produced using methods known for the production of layer arrangements. The two above-mentioned requirements, namely the good electrical conductivity (or the lower sheet resistance) of the back electrode and its production using known methods as a very thin layer contradict each other, since it has not been possible up to now to produce such thin layers with high electrical conductivity in a corresponding layer thickness. This problem is exacerbated when it is necessary or desired to avoid using organic solvents in the production of the electroluminescence device.

BRIEF DESCRIPTION

The problem addressed by the present disclosure is to provide a composition which enables thin layers having a high conductivity to be produced on the basis of a water-based system.

The problem is solved by a composition for producing an electrically conductive layer according to claim 1. The composition according to one aspect comprises 2-30 wt. %, preferably 5-15 wt. %, of a protective colloid mixture which is soluble or dispersible in water, 1-15 wt. %, preferably 2-10 wt. %, of a conductive carbon modification, 5-50 wt. %, preferably 5-30 wt. %, metal-coated particles, 50-90 wt. %, preferably 65-80%, of an aqueous solvent, in particular pure water, the dynamic viscosity of the conductive composition being less than 400 mPa·s. According to this aspect, it is essential that the composition comprises 0.1-10 wt. %, preferably 0.1-3 wt. %, of an ethylene-vinyl acetate copolymer (as a component of the protective colloid mixture).

Surprisingly, it has been found that when a protective colloid mixture which is soluble or dispersible in water and contains a claimed portion of an ethylene-vinyl acetate copolymer is used, it is possible to considerably reduce the sheet resistance of the composition, although the ethylene-vinyl acetate copolymer itself is not conductive. It is assumed that, with the protective colloid mixture according to one aspect, it is possible to keep the conductive fillers of the composition, i.e. the conductive carbon modification and the metal-coated particles, in the solution such that they do not separate during the production process, so that they are applied very evenly and thus the low sheet resistance is made possible. By keeping the dynamic viscosity of the composition less than 400 mPa·s according to one aspect, the composition according to this aspect can be processed using a slotted-nozzle method.

By the combination of the conductive carbon modifications with the metal-coated particles, it is surprisingly possible, when using the protective colloid blend according to one aspect, to significantly increase the electrical conductivity of a layer produced from the composition according to this aspect, which is reflected in an unexpectedly small sheet resistance of less than 30Ω/□, sometimes of less than 5Ω/□. It is assumed that the smaller particles of the carbon modification settle between the metal-coated particles and thus fill the gaps between the metal-coated particles, which considerably increases the conductivity of an electrode produced on the basis of the composition according to this aspect. The mixture of the two conductive fillers, i.e. the conductive carbon modification and the metal-coated particles, counteracts anisotropic behavior of the individual compounds and surprisingly prevents breakdown effects due to a dielectric arranged between the front and back electrodes and comprising the electroluminescent particles, as a result of which damage to an electroluminescence device, which comprises a back electrode based on the composition according to ones aspect, is prevented within the usual scope of application.

Therefore, with the composition according to one aspect it is possible, despite the use of water as a solvent, to produce a thin, electrically conductive layer, which, due to the very low sheet resistance of less than 30Ω/□, allows an increased luminance of an electroluminescence device in which an electrode based on the composition is used. Furthermore, by avoiding the breakdown effect, damage to a corresponding electroluminescence device is prevented. The use of water as a solvent also means that there is no need to use expensive suction devices to remove solvent vapors that are hazardous to health.

The composition according to one aspect exerts its effect in the above-mentioned "broad" figures on the wt. %; the preferred ranges work "better," i.e. the reduction in the sheet resistance is more significant with a composition according to the "narrow" figures.

The individual components of the composition, i.e. the protective colloid mixture and the conductive carbon modification and the metal-coated particles, are not purely provided as commercially available compounds, but rather as a dispersion, suspension, gels or the like having a certain active substance content. For example, an aqueous protective colloid dispersion having 50% active substance content provides both a proportion of the aqueous solvent and of the protective colloid for the composition. A composition having 20 wt. % of a commercially available protective colloid dispersion thus comprises only 10 wt. % protective colloid at an active substance content of 50%.

In the context of the present disclosure, the term "protective colloid mixture" is only intended to explain that the composition according to one aspect comprises two or more different protective colloids. The term mixture is not intended to express that the protective colloids must be mixed, for example when the composition is produced.

The composition according to one aspect is suitable for being processed according to a slotted-nozzle method. With regard to the use of an electrode layer produced from the composition, it is preferred that the composition according to one aspect is processed according to the cascade casting method, which is a special form of the slotted-nozzle method.

The composition according to this or another aspect comprises a protective colloid mixture of two or more protective colloids, it being essential according to this aspect that the composition comprises 0.1-10 wt. % of an ethylene-vinyl acetate copolymer (as a component of the protective colloid mixture); only in this way can the low sheet resistance or the increased conductivity can be achieved.

Different compounds can be used as further protective colloid(s) of the protective colloid mixture. Protective colloids are usually polymer systems which are intended to prevent agglomeration and coagulation of a dispersed substance in dispersions and, after drying, form the layer in which the fillers are embedded. Natural substances such as gelatin, starch, chitosan, casein and dextrin and the derivatives thereof are used as protective colloids, but synthetic polymers such as polyvinyl alcohols, polyvinyl pyrrolidones, polyacrylic acids, polyacrylates, polyacrylamides, polyurethanes and common copolymers can also be used.

In the composition according to one aspect, two electrically conductive fillers having different sizes are present, the smaller particles settling into the spaces between the larger particles and "bridging" them. When using at least two different protective colloids, it seems that the two different fillers can be kept in balance particularly well.

The composition according to one aspect contains 0.1-10 wt. % of an ethylene-vinyl acetate copolymer (EVAC). If the above-mentioned amount is admixed, a considerable reduction in the sheet resistance can be observed, as is proven by the data set out below. The composition particularly preferably comprises 0.7-1.5 wt. % of an ethylene-vinyl acetate copolymer. The above-mentioned quantity seems to be particularly well suited to keeping the fillers evenly distributed in the composition, since the sheet resistances of electrodes based on corresponding compositions are particularly low. With smaller and larger quantities of the copolymer, the sheet resistances increase again. It has not yet been clarified why this quantity range can so significantly reduce the sheet resistance.

In one exemplary embodiment, the composition comprises, in addition to the EVAC copolymer, 2.5-25 wt. % of polyacrylate polymer. It has been found that this protective colloid interacts particularly well with the EVAC copolymer. The polyacrylate dry coating corresponds to a quantity of from 2.5 g/m$^2$ to 25 g/m$^2$ and preferably from 5 g/m$^2$ to 15 g/m$^2$. The EVAC coating corresponds to a quantity of from 0.1 g/m$^2$ to 10 g/m$^2$, preferably 0.1-3 wt. % and particularly preferably of from 0.7 g/m$^2$ to 1.5 g/m$^2$.

With regard to the metal-coated particles, it has been found that silver-coated particles in particular are effective, the particle itself preferably being made of glass or copper, with a silver coating of 20-60 wt. %. The use of silver-coated glass or copper flakes, which are distinguished by a high aspect ratio (width/length in relation to the height), is particularly advantageous. The flakes preferably have aspect ratios of greater than 50, particularly preferably greater than 75. Flakes having a corresponding aspect ratio can be kept in suspension well even when using relatively small amounts of protective colloid, which is essential for homogeneous distribution in the layer produced from the composition. The substance mixture preferably contains 5-50 wt. % of silver-coated glass or copper particles, particularly preferably 5-30 wt. % of the total formulation. The dry coating corresponds to a quantity of from 5 g/m$^2$ to 50 g/m$^2$ and preferably of from 5 g/m$^2$ to 30 g/m$^2$.

Electrically conductive carbon modifications may be carbon fibers and nanotubes, graphite and carbon black particles. The substance mixture preferably contains 1.0-15 wt. % of a commercially available graphite, preferably 1.5-7.5 wt. % of the total formulation. The dry graphite coating preferably corresponds to a quantity of from 1 g/m$^2$ to 15 g/m$^2$ and preferably of from 1.5 g/m$^2$ to 7.5 g/m$^2$.

The present disclosure further relates to a method for producing an electroluminescence device, comprising a first and a second conductive layer and a luminous layer with electroluminescent pigments arranged between the conductive layers, characterized in that the first and/or the second conductive layer is printed or cast on the basis of the above-described composition according to one aspect. By using the composition according to one aspect, electroluminescence devices having increased luminosity can be produced without having to resort to the use of organic solvents or the like. Only the composition according to this aspect makes it at all possible to produce electroluminescence devices having a greatly increased luminosity and at the same time very low layer thicknesses, since only the composition according to this aspect can be cast or printed due to the very low dynamic viscosity.

A casting apparatus which can be adapted to the width required in each case is preferably used for the manufacture of the electroluminescence device. The electroluminescence device is preferably manufactured such that it can be cut with tools such as scissors or cutting rollers without impairing its function.

In another exemplary embodiment, at least one layer, preferably more than one layer and particularly preferably all the layers, of the electroluminescence device are applied using water-based compositions by means of a printing process, in particular an inkjet-printing process.

The disclosure relates to an electroluminescence device, comprising a first and a second conductive layer and a luminous layer with electroluminescence pigments arranged between the conductive layers, characterized in that the first and/or the second conductive layer is obtainable by printing or casting a conductive composition according to one aspect. Finally, the disclosure relates to the use of a conductive layer obtainable by printing or casting the composition according to this aspect to produce an electroluminescent system.

EXAMPLES

The following examples are for illustrative purposes only and are not intended to limit the scope of the present disclosure or to be interpreted as limiting.

Materials:

If not explicitly mentioned, the chemicals are used as supplied after vigorous stirring without further treatment.

eConduct Copper 044000 from Eckart GmbH: Silver (40 wt. %) coated copper particles having an average size (D50) of 4 µm eConduct Glass 205000 from Eckart GmbH: Silver (50 wt. %) coated glass particles having an average size (D50) of 20 µm SG15TF40 from Potters Industries Inc.: Silver (40 wt. %) coated glass particles having an average size of 15 µm Carbon black from Evonik Carbon Black GmbH: Aqueous carbon black dispersion (27 wt. % solids content)

Neromix E12 from Timcal Graphite & Carbon: Aqueous graphite dispersion (30 wt. % solids content)

Acronal A310S from BASF SE: Aqueous dispersion of a copolyacrylate (55 wt. % solids content); in all examples, Acronal A310S is used according to the technical data or composition from February 2015 (https://www.dispersions pigments.basf.com/portal/load/fid819873/TI_ED_1438_e_Acronal_A 310_S_186112_SCREEN_01.pdf).

Aquatix 8421 from BYK Chemie GmbH: EVA wax emulsion (20 wt. % solids content); in all examples, Aquatix 8421 was used according to the composition according to the technical data sheet from October 2016 (https://additives.byk.com/output/ag_download.aspx?file=TDS_AQ UATIX_8421_DE.pdf).

Afcona 3585 from Afcona Additives Sdn Bhd: Organically modified polysiloxane (5 wt. % solids content); in all examples, Afcona 3583 was used according to the composition according to the technical data sheet from October 2017 (https://www.afcona.com.my/entAttchDL.php?iID=704).

Afena from Agfa Gevert: End-group-modified polyoxyethylene (5 wt. % solids content).

Laponite SL25 from BYK Chemie GmbH: Phyllosilicates (25 wt. % solids content); in all examples, Laponite SL25 was used according to the composition according to the technical data sheet from October 2013 (https://additives.byk.com/output/ag_download.aspx?file=PB %20L aponite %20SL25_EN.pdf).

In the case of the above-mentioned commercial emulsions/dispersions, the carrier material is water. As appropriate, other additives contained have no influence on this aspect.

General Approach:

First, the protective colloids and the solvent are provided and homogenized in the vessel for 10 minutes with a magnetic stirrer for smaller batches or with a blade stirrer/propeller stirrer or disk stirrer for larger batch sizes. The process-related auxiliaries are added to this solution/dispersion and homogenized for a further 10 minutes. The mixture is then preferably heated to 42° C. The electrically conductive fillers influence the physical properties of the solution/dispersion. They are therefore added to the casting solution at a certain point in time before the coating process in order to achieve optimum casting properties (flow behavior, homogeneity, viscosity). The composition is adjusted such that the dynamic viscosity thereof with the electrically conductive fillers at casting temperatures between 20 and 50° C. is <400 mPa·s.

Example 1.1

This example serves as a reference without EVAC emulsion for the following example 1.2.

The substance mixture comprises 52.7 wt. % demineralized water, 18.1 wt. % Acronal A310S, 0.9 wt. % Afcona 3585 (5%), 1.3 wt. % Afena, 11.7 wt. % Neromix E12 and 15.5 wt. % AgGlass-5 µm SG05TF40. With a wet coating of 103.4 µm, sheet resistances of 11.0±3.2Ω/□ were achieved.

Example 1.2

The substance mixture comprises 48.5 wt. % demineralized water, 15.7 wt. % Acronal A310S, 6.5 wt. % Aquatix 8421, 0.9 wt. % Afcona 3585 (5%), 1.3 wt. % Afena, 11.7 wt. % Neromix E12 and 15.5 wt. % AgGlass-5 µm SG05TF40. With a wet coating of 103.4 µm, sheet resistances of 2.8±0.4Ω/□ were achieved.

Example 2.1

This example serves as a reference without EVAC emulsion for the following examples 2.2-2.4.

The substance mixture comprises 52.7 wt. % demineralized water, 18.1 wt. % Acronal A310S, 0.9 wt. % Afcona 3585 (5%), 1.3 wt. % Afena, 11.7 wt. % Neromix E12 and 15.5 wt. % eConduct Copper 044000. With a wet coating of 103.4 µm, sheet resistances of 28.5±5.4Ω/□ were achieved.

Example 2.2

The substance mixture comprises 50.6 wt. % demineralized water, 16.9 wt. % Acronal A310S, 3.2 wt. % Aquatix 8421, 0.9 wt. % Afcona 3585 (5%), 1.3 wt. % Afena, 11.7 wt. % Neromix E12 and 15.5 wt. % eConduct Copper 044000. With a wet coating of 103.4 µm, sheet resistances of 7.9±0.6Ω/□ were achieved.

Example 2.3

The substance mixture comprises 48.5 wt. % demineralized water, 15.7 wt. % Acronal A310S, 6.5 wt. % Aquatix 8421, 0.9 wt. % Afcona 3585 (5%), 1.3 wt. % Afena, 11.7 wt. % Neromix E12 and 15.5 wt. % eConduct Copper 044000. With a wet coating of 103.4 µm, sheet resistances of 4.9±0.2Ω/□ were achieved.

Example 2.4

The substance mixture comprises 46.5 wt. % demineralized water, 14.6 wt. % Acronal A310S, 9.7 wt. % Aquatix 8421, 0.9 wt. % Afcona 3585 (5%), 1.3 wt. % Afena, 11.7 wt. % Neromix E12 and 15.5 wt. % eConduct Copper 044000. With a wet coating of 103.4 µm, sheet resistances of 15.5±1.3Ω/□ were achieved.

Example 3

The substance mixture contains 48.5 wt. % demineralized water, 15.7 wt. % Acronal A310S, 6.5 wt. % Aquatix 8421, 0.9 wt. % Afcona 3585 (5%), 1.3 wt. % Afena, 11.7 wt. % Neromix E12 and 15.5 wt. % eConduct Copper 044000. With a wet coating of 103.3 µm, sheet resistances of 7.8±2.8Ω/□ were achieved.

Example 4

The substance mixture contains 48.5 wt. % demineralized water, 15.7 wt. % Acronal A310S, 6.5 wt. % Aquatix 8421, 0.9 wt. % Afcona 3585 (5%), 1.3 wt. % Afena, 11.7 wt. % Neromix E12 and 15.5 wt. % eConduct Glass 205000. With a wet coating of 103.3 µm, sheet resistances of 17.5±4.9Ω/□ were achieved.

Example 5

The substance mixture contains 51.3 wt. % demineralized water, 15.7 wt. % Acronal A310S, 6.5 wt. % Aquatix 8421, 0.9 wt. % Afcona 3585 (5%), 0.4 wt. % Afena, 9.7 wt. % Neromix E12 and 15.5 wt. % SG05TF40. With a wet coating of 103.3 μm, sheet resistances of 4.9±0.4Ω/□ were achieved.

Example 6

The substance mixture contains 60.3 wt. % demineralized water, 15.4 wt. % Acronal A310S, 1.1 wt. % Aquatix 8421, 0.7 wt. % Afcona 3585 (5%), 0.5 wt. % Afena, 0.8 wt. % Laponite SL25, 11.4 wt. % Neromix E12 and 10.1 wt. % SG05TF40. With a wet coating of 103.3 μm, sheet resistances of 24.8±1.3Ω/□ were achieved.

In the following, examples are summarized again in tabular form, the wt. % of the aqueous composition mentioned in the previous brief descriptions being shown again. However, the constituents of the composition according to various aspects of the present disclosure are generally not available in a pure state, but rather routinely as dispersions, suspensions or the like, i.e. the active substance content is not 100%, but is usually significantly lower. The following tables also include the absolute g figures for the active substances; the relative amount of active substance can thus be determined on the basis of the total mass of the composition. Alternatively, the wt. % of the active substances can be determined on the basis of the active substance content and the indication of the wet % (in example 3, the aqueous composition for example comprises 15.7 wet wt. % Acronal, and at an active substance content of 55% this results in a wt. % of the active substance of 8.64 wt. %).

TABLE 1

Summary of example 1.1, with solvent, in the dried state

| | | Example 1.1 | | | NA [μm]: | |
| | | | | | 103.4 | |
| | Active | | Active | | | |
| Chemical | substance content | Wet % | substance % | Wet g/m² | Dry g/m² | Dry % |
|---|---|---|---|---|---|---|
| Water | 0 | 52.7 | 71.34 | 54.44 | 0 | 0 |
| Acronal | 0.55 | 18.1 | 9.95 | 18.71 | 10.29 | 34.72 |
| Aquatix | 0.2 | 0 | 0 | 0 | 0 | 0 |
| Afcona | 0.05 | 0.9 | 0.04 | 0.9 | 0.05 | 0.15 |
| Afena | 0.05 | 1.3 | 0.06 | 1.29 | 0.06 | 0.22 |
| Laponite | 0.25 | 0 | 0 | 0 | 0 | 0 |
| DSDVU | 0.27 | 0 | 0 | 0 | 0 | 0 |
| Neromix | 0.3 | 11.7 | 3.15 | 12.06 | 3.26 | 10.99 |
| Flakes | 1 | 15.5 | 15.46 | 15.98 | 15.98 | 53.92 |
| | | 100.2 | 100 | 103.38 | 29.64 | 100 |

TABLE 2

Summary of example 1.2, with solvent, in the dried state

| | | Example 1.2 | | | NA [μm]: | |
| | | | | | 103.4 | |
| | Active | | Active | | | |
| Chemical | substance content | Wet % | substance % | Wet g/m² | Dry g/m² | Dry % |
|---|---|---|---|---|---|---|
| Water | 0 | 48.5 | 71.34 | 50.17 | 0 | 0 |
| Acronal | 0.55 | 15.7 | 8.65 | 16.27 | 8.95 | 30.19 |

TABLE 2-continued

Summary of example 1.2, with solvent, in the dried state

| | | Example 1.2 | | | NA [μm]: | |
| | | | | | 103.4 | |
| | Active | | Active | | | |
| Chemical | substance content | Wet % | substance % | Wet g/m² | Dry g/m² | Dry % |
|---|---|---|---|---|---|---|
| Aquatix | 0.2 | 6.5 | 1.3 | 6.71 | 1.34 | 4.53 |
| Afcona | 0.05 | 0.9 | 0.04 | 0.9 | 0.05 | 0.15 |
| Afena | 0.05 | 1.3 | 0.06 | 1.29 | 0.06 | 0.22 |
| Laponite | 0.25 | 0 | 0 | 0 | 0 | 0 |
| DSDVU | 0.27 | 0 | 0 | 0 | 0 | 0 |
| Neromix | 0.3 | 11.7 | 3.15 | 12.06 | 3.26 | 10.99 |
| Flakes | 1 | 15.5 | 15.46 | 15.98 | 15.98 | 53.93 |
| | | 100.1 | 100 | 103.38 | 29.64 | 100.01 |

TABLE 3

Summary of example 2.1, with solvent, in the dried state

| | | Example 2.1 | | | NA [μm]: | |
| | | | | | 103.4 | |
| | Active | | Active | | | |
| Chemical | substance content | Wet % | substance % | Wet g/m² | Dry g/m² | Dry % |
|---|---|---|---|---|---|---|
| Water | 0 | 52.7 | 71.34 | 54.45 | 0 | 0 |
| Acronal | 0.55 | 18.1 | 9.95 | 18.71 | 10.29 | 34.72 |
| Aquatix | 0.2 | 0 | 0 | 0 | 0 | 0 |
| Afcona | 0.05 | 0.9 | 0.04 | 0.9 | 0.05 | 0.15 |
| Afena | 0.05 | 1.3 | 0.06 | 1.29 | 0.06 | 0.22 |
| Laponite | 0.25 | 0 | 0 | 0 | 0 | 0 |
| DSDVU | 0.27 | 0 | 0 | 0 | 0 | 0 |
| Neromix | 0.3 | 11.7 | 3.15 | 12.06 | 3.26 | 10.98 |
| Flakes | 1 | 15.5 | 15.46 | 15.98 | 15.98 | 53.93 |
| | | 100.2 | 100 | 103.39 | 29.64 | 100 |

TABLE 4

Summary of example 2.2, with solvent, in the dried state

| | | Example 2.2 | | | NA [μm]: | |
| | | | | | 103.4 | |
| | Active | | Active | | | |
| Chemical | substance content | Wet % | substance % | Wet g/m² | Dry g/m² | Dry % |
|---|---|---|---|---|---|---|
| Water | 0 | 50.6 | 71.34 | 52.31 | 0 | 0 |
| Acronal | 0.55 | 16.9 | 9.3 | 17.49 | 9.62 | 32.45 |
| Aquatix | 0.2 | 3.2 | 0.65 | 3.36 | 0.67 | 2.26 |
| Afcona | 0.05 | 0.9 | 0.04 | 0.9 | 0.05 | 0.15 |
| Afena | 0.05 | 1.3 | 0.06 | 1.29 | 0.06 | 0.22 |
| Laponite | 0.25 | 0 | 0 | 0 | 0 | 0 |
| DSDVU | 0.27 | 0 | 0 | 0 | 0 | 0 |
| Neromix | 0.3 | 11.7 | 3.15 | 12.06 | 3.26 | 10.99 |
| Flakes | 1 | 15.5 | 15.46 | 15.98 | 15.98 | 53.93 |
| | | 100.1 | 100 | 103.39 | 29.64 | 100 |

TABLE 5

Summary of example 2.3, with solvent, in the dried state

| Chemical | Example 2.3 Active substance content | Active Wet % | Active substance Wet % | Wet g/m² | NA [µm]: 103.4 Dry g/m² | Dry % |
|---|---|---|---|---|---|---|
| Water | 0 | 48.5 | 71.34 | 50.18 | 0 | 0 |
| Acronal | 0.55 | 15.7 | 8.65 | 16.27 | 8.95 | 30.19 |
| Aquatix | 0.2 | 6.5 | 1.3 | 6.71 | 1.34 | 4.53 |
| Afcona | 0.05 | 0.9 | 0.04 | 0.9 | 0.05 | 0.15 |
| Afena | 0.05 | 1.3 | 0.06 | 1.29 | 0.06 | 0.22 |
| Laponite | 0.25 | 0 | 0 | 0 | 0 | 0 |
| DSDVU | 0.27 | 0 | 0 | 0 | 0 | 0 |
| Neromix | 0.3 | 11.7 | 3.15 | 12.06 | 3.26 | 10.99 |
| Flakes | 1 | 15.5 | 15.46 | 15.98 | 15.98 | 53.93 |
|  |  | 100.1 | 100 | 103.39 | 29.64 | 100.01 |

TABLE 6

Summary of example 2.4, with solvent, in the dried state

| Chemical | Example 2.4 Active substance content | Active Wet % | Active substance Wet % | Wet g/m² | NA [µm]: 103.4 Dry g/m² | Dry % |
|---|---|---|---|---|---|---|
| Water | 0 | 46.5 | 71.33 | 48.04 | 0 | 0 |
| Acronal | 0.55 | 14.6 | 8.01 | 15.05 | 8.28 | 27.92 |
| Aquatix | 0.2 | 9.7 | 1.95 | 10.07 | 2.01 | 6.79 |
| Afcona | 0.05 | 0.9 | 0.04 | 0.9 | 0.05 | 0.15 |
| Afena | 0.05 | 1.3 | 0.06 | 1.29 | 0.06 | 0.22 |
| Laponite | 0.25 | 0 | 0 | 0 | 0 | 0 |
| DSDVU | 0.27 | 0 | 0 | 0 | 0 | 0 |
| Neromix | 0.3 | 11.7 | 3.15 | 12.06 | 3.26 | 10.98 |
| Flakes | 1 | 15.5 | 15.46 | 15.98 | 15.98 | 53.93 |
|  |  | 100.2 | 100 | 103.39 | 29.64 | 99.99 |

TABLE 7

Summary of example 3, with solvent, in the dried state

| Chemical | Example 3 Active substance content | Active Wet % | Active substance Wet % | Wet g/m² | NA [µm]: 103.4 Dry g/m² | Dry % |
|---|---|---|---|---|---|---|
| Water | 0 | 48.5 | 71.28 | 50.15 | 0 | 0 |
| Acronal | 0.55 | 15.7 | 8.64 | 16.23 | 8.93 | 30.08 |
| Aquatix | 0.2 | 6.5 | 1.3 | 6.72 | 1.34 | 4.53 |
| Afcona | 0.05 | 0.9 | 0.05 | 0.93 | 0.05 | 0.16 |
| Afena | 0.05 | 1.3 | 0.07 | 1.34 | 0.07 | 0.23 |
| Laponite | 0.25 | 0 | 0 | 0 | 0 | 0 |
| DSDVU | 0.27 | 0 | 0 | 0 | 0 | 0 |
| Neromix | 0.3 | 11.7 | 3.16 | 12.1 | 3.27 | 11.01 |
| Flakes | 1 | 15.5 | 15.5 | 16.03 | 16.03 | 54 |
|  |  | 100.1 | 100 | 103.5 | 29.69 | 100.01 |

TABLE 8

Summary of example 4, with solvent, in the dried state

| Chemical | Example 4 Active substance content | Active Wet % | Active substance Wet % | Wet g/m² | NA [µm]: 103.4 Dry g/m² | Dry % |
|---|---|---|---|---|---|---|
| Water | 0 | 48.5 | 71.28 | 50.15 | 0 | 0 |
| Acronal | 0.55 | 15.7 | 8.64 | 16.23 | 8.93 | 30.08 |
| Aquatix | 0.2 | 6.5 | 1.3 | 6.72 | 1.34 | 4.53 |
| Afcona | 0.05 | 0.9 | 0.05 | 0.93 | 0.05 | 0.16 |
| Afena | 0.05 | 1.3 | 0.07 | 1.34 | 0.07 | 0.23 |
| Laponite | 0.25 | 0 | 0 | 0 | 0 | 0 |
| DSDVU | 0.27 | 0 | 0 | 0 | 0 | 0 |
| Neromix | 0.3 | 11.7 | 3.16 | 12.1 | 3.27 | 11.01 |
| Flakes | 1 | 15.5 | 15.5 | 16.03 | 16.03 | 54 |
|  |  | 100.1 | 100 | 103.5 | 29.69 | 100.01 |

TABLE 9

Summary of example 5, with solvent, in the dried state

| Chemical | Example 5 Active substance content | Active Wet % | Active substance Wet % | Wet g/m² | NA [µm]: 103.4 Dry g/m² | Dry % |
|---|---|---|---|---|---|---|
| Water | 0 | 51.3 | 71.87 | 52.99 | 0 | 0 |
| Acronal | 0.55 | 15.7 | 8.64 | 16.22 | 8.92 | 30.71 |
| Aquatix | 0.2 | 6.5 | 1.3 | 6.71 | 1.34 | 4.62 |
| Afcona | 0.05 | 0.9 | 0.05 | 0.93 | 0.05 | 0.16 |
| Afena | 0.05 | 0.4 | 0.02 | 0.41 | 0.02 | 0.07 |
| Laponite | 0.25 | 0 | 0 | 0 | 0 | 0 |
| DSDVU | 0.27 | 0 | 0 | 0 | 0 | 0 |
| Neromix | 0.3 | 9.7 | 2.62 | 10.02 | 2.71 | 9.31 |
| Flakes | 1 | 15.5 | 15.5 | 16.01 | 16.01 | 55.12 |
|  |  | 100 | 100 | 103.29 | 29.05 | 99.99 |

TABLE 10

Summary of example 6, with solvent, in the dried state

| Chemical | Example 6 Active substance content | Active Wet % | Active substance Wet % | Wet g/m² | NA [µm]: 103.4 Dry g/m² | Dry % |
|---|---|---|---|---|---|---|
| Water | 0 | 60.3 | 77.52 | 62.29 | 0 | 0 |
| Acronal | 0.55 | 15.4 | 8.47 | 15.91 | 8.75 | 37.7 |
| Aquatix | 0.2 | 1.1 | 0.22 | 1.14 | 0.23 | 1 |
| Afcona | 0.05 | 0.7 | 0.04 | 0.72 | 0.04 | 0.2 |
| Afena | 0.05 | 0.5 | 0.03 | 0.52 | 0.03 | 0.1 |
| Laponite | 0.25 | 0.8 | 0.2 | 0.83 | 0.21 | 0.9 |
| DSDVU | 0.27 | 0 | 0 | 0 | 0 | 0 |
| Neromix | 0.3 | 11.4 | 3.42 | 11.78 | 3.53 | 15.2 |
| Flakes | 1 | 10.1 | 10.1 | 10.43 | 10.43 | 44.9 |
|  |  | 100.3 | 100 | 103.62 | 23.22 | 100 |

On the basis of the above-mentioned aqueous compositions, back electrodes were preferably cast or printed in a cascade casting method and their sheet resistance and (sometimes the) dynamic viscosity were determined. A Loresta-AX, model MCP-T370, was used to determine the sheet resistance, and a Brookfield RVDV-II+Pro Extra rotational viscometer was used to measure the dynamic viscosity.

As can be seen from Table 11 below, which summarizes examples 1.1-2.4, the sheet resistance of the compositions with the EVAC copolymer is significantly lower than that of the compositions without EVAC copolymer. In examples 1.1 and 2.1, the composition does not comprise an EVAC copolymer; in examples 1.2, 2.2, 2.3 and 2.4, EVAC copolymer is present in the composition. In examples 1.1/1.2, the addition of 6.5 wt. % of Aquatix emulsion (corresponds to 1.3 wt. % of ethylene-vinyl acetate copolymer based on the total mass of the composition) results in a reduction in the sheet resistance by almost 75%. In examples 2.1-2.4, it can be seen that the wt. % of the ethylene-vinyl acetate copolymer has a decisive influence. With a proportion of 1.3 wt. % of ethylene-vinyl acetate copolymer (6.5% emulsion with 20% active substance or polymer content), the reduction in the sheet resistance is greatest, while the reduction with a lower wt. % (3.2 wt. % emulsion, 0.64 wt. % polymer) and a greater wt. % (9.7 wt. % emulsion, 1.94 wt. % polymer) is significantly lower. The reduction goes through a maximum with increasing wt. % and then drops again.

Table 12 summarizes the results of examples 3-6 (when taking out examples 6, 8 and 9, as noted). Here you can also see that the sheet resistance is very low in all examples. It can also be seen that this low sheet resistance can be achieved with compositions with low viscosity.

The electroluminescence device can be produced according to known methods. For example, it is possible to produce all castable layers of the electroluminescence device using the cascade method, the back electrode being produced on the basis of the composition according to one aspect. Which of the many methods known to a person skilled in the art is used to produce the electroluminescence device is not essential to the present disclosure. It is essential that the composition according to one aspect is used for at least the back electrode, since this is the only way to achieve the high luminances.

TABLE 11

Summary of examples 1.1-2.4, results for sheet resistance, statement of the wt. % may refer to the active substances as an emulsion, etc.

|  | Unit | Example 1.1 | Example 1.2 | Example 2.1 | Example 2.2 | Example 2.3 | Example 2.4 |
|---|---|---|---|---|---|---|---|
| Solvent | % | 52.7 | 48.5 | 52.7 | 50.6 | 48.5 | 46.5 |
| Binder | % | 18.1 | 15.7 | 18.1 | 16.9 | 15.7 | 14.6 |
| Aquatix |  | 0 | 6.5 | 0 | 3.2 | 6.5 | 9.7 |
| AgCu-4 μm | % | 0 | 0 | 15.5 | 15.5 | 15.5 | 15.5 |
| AgGlass-20 μm | % |  |  |  |  |  |  |
| AgGlass-5 μm | % | 15.5 | 15.5 | 0 | 0 | 0 | 0 |
| Graphite | % |  |  |  |  |  |  |
| Conductive carbon black | % | 11.7 | 11.7 | 11.7 | 11.7 | 11.7 | 11.7 |
| Auxiliaries | % | 2.1 | 2.1 | 2.1 | 2.1 | 2.1 | 2.1 |
| Rheology modifier | % |  |  |  | 1.0 | 0.8 |  |
| Speed 1 | min-1 |  |  |  | — | — |  |
| Viscosity 1 | mPa · s |  |  |  | — | — |  |
| Speed 2 | min-1 |  |  |  | — | — |  |
| Viscosity 2 | mPa · s |  |  |  | — | — |  |
| Thixotropy index |  |  |  |  |  |  | — |
| Wet coating | μm | 103.3 | 103.3 | 103.3 | 114.7 | 103.3 | 239.4 |
| Sheet resistance | Ω/□ | 11 | 2.8 | 28.5 | 7.9 | 4.9 | 15.5 |
| Standard deviation | Ω/□ | 3.2 | 0.4 | 5.4 | 0.6 | 0.2 | 1.3 |

TABLE 12

Summary of examples 3-9, results for sheet resistance

|  | Unit | Example 3 | Example 4 | Example 5 | Example 6 |
|---|---|---|---|---|---|
| Solvent | % | 48.5 | 48.5 | 51.3 | 60.3 |
| Binder | % | 15.7 | 15.7 | 15.7 | 15.4 |
| Aquatix | % | 6.5 | 6.5 | 6.5 | 1.1 |
| AgCu-4 μm | % | 15.5 |  |  |  |
| AgGlass-20 μm | % |  | 15.5 |  |  |
| AgGlass-5 μm | % |  |  | 15.5 | 10.1 |
| Graphite | % | 11.7 | 11.7 | 9.7 | 11.4 |
| Conductive carbon black | % |  |  |  |  |
| Auxiliaries | % | 2.2 | 2.2 | 1.3 | 1.2 |
| Rheology modifier | % |  |  |  | 0.8 |
| Speed 1 | min$^{-1}$ | 20 | 20 | 20 | — |
| Viscosity 1 | mPa · s | 0 | 16.2 | 0 | — |
| Speed 2 | min$^{-1}$ | 200 | 200 | 200 | — |
| Viscosity 2 | mPa · s | 4.6 | 31.8 | 3.9 | — |
| Thixotropy index |  | — | 1.96 | — | — |
| Wet coating | μm | 103.3 | 103.3 | 103.3 | 103.3 |
| Sheet resistance | Ω/□ | 7.8 | 17.5 | 4.9 | 24.8 |
| Standard deviation | Ω/□ | 2.8 | 4.9 | 0.4 | 1.3 |

Accordingly, electroluminescence devices with increased luminance can be produced on the basis of the composition according to one aspect, which significantly increases their scope of application. This is achieved by means of the composition according to one aspect, in which, surprisingly, despite the use of an aqueous solvent, preferably pure water, due to the use of a protective colloid, a plurality of conductive fillers can be dispersed such that a back electrode having a greatly increased conductivity can be obtained on the basis of this composition. According to this aspect, it is therefore possible to avoid separation of the composition, in particular, the electrically conductive fillers are kept in suspension and are thus distributed well in the subsequent electrode such that the increased conductivity results.

The invention claimed is:

1. Composition for producing an electrically conductive layer according to a slotted-nozzle method, comprising
- 2-30 wt. % of a protective colloid mixture which is soluble or dispersible in water,
- 1-15 wt. % of a conductive carbon modification,
- 5-50 wt. % of metal-coated particles,
- 50-90 wt. % of an aqueous solvent,
- the dynamic viscosity of the conductive composition being less than 400 mPa·s,
- wherein the composition comprises 0.1-10 wt. % of an ethylene-vinyl acetate copolymer.

2. Composition for producing an electrically conductive layer according to a slotted-nozzle method according to claim 1, comprising
- 5-15 wt. % of a protective colloid mixture which is soluble or dispersible in water,
- 2-10 wt. % of a conductive carbon modification,
- 5-30 wt. % of metal-coated particles,
- 65-80 wt. % of an aqueous solvent,
- the dynamic viscosity of the conductive composition being less than 400 mPa·s,
- wherein the composition comprises 0.1-3 wt. % of an ethylene-vinyl acetate copolymer.

3. Composition for producing an electrically conductive layer according to a slotted-nozzle method according to claim 2, wherein the composition comprises 2.5-25 wt. % polyacrylate.

4. Composition for producing an electrically conductive layer according to a slotted-nozzle method according to claim 2, wherein the composition comprises 5-15 wt. % polyacrylate.

5. Composition for producing an electrically conductive layer according to a slotted-nozzle method according to claim 2, wherein the metal-coated particles are silver-coated.

6. Composition for producing an electrically conductive layer according to a slotted-nozzle method according to claim 1, wherein the composition comprises 2.5-25 wt. % polyacrylate.

7. Composition for producing an electrically conductive layer according to a slotted-nozzle method according to claim 6, wherein the metal-coated particles are silver-coated.

8. Composition for producing an electrically conductive layer according to a slotted-nozzle method according to claim 1, wherein the metal-coated particles are silver-coated.

9. Composition for producing an electrically conductive layer according to a slotted-nozzle method according to claim 8, wherein the silver-coated particles are silver-coated copper or glass particles, the silver coating of which is 20-60 wt. %.

10. Composition for producing an electrically conductive layer according to a slotted-nozzle method according to claim 9, wherein the silver-coated glass or copper particles have the shape of flakes with a high aspect ratio.

11. Composition for producing an electrically conductive layer according to a slotted-nozzle method according to claim 1, wherein the conductive carbon modification is selected from a group consisting of graphite, carbon-black particles, nanotubes.

12. Composition for producing an electrically conductive layer according to a slotted-nozzle method according to claim 8, wherein the silver-coated particles are silver-coated glass particles, the silver coating of which is 20-60 wt. %.

13. Method for producing an electroluminescence device, comprising a first and a second conductive layer and a luminous layer with electroluminescent pigments arranged between the conductive layers, wherein the first and/or the second conductive layer is printed or cast on the basis of a composition according to claim 1.

14. Electroluminescence device, comprising a first and a second conductive layer and a luminous layer with electroluminescence pigments arranged between the conductive layers, wherein the first and/or the second conductive layer is obtainable by printing or casting a conductive composition according to claim 1.

15. A method of using a conductive layer comprising printing or casting a composition according to claim 1 to produce an electroluminescent system.

16. Composition for producing an electrically conductive layer according to a slotted-nozzle method according to claim 1, wherein the composition comprises 0.7-1.5 wt. % of an ethylene-vinyl acetate copolymer.

17. Composition for producing an electrically conductive layer according to a slotted-nozzle method according to claim 16, wherein the composition comprises 2.5-25 wt. % polyacrylate.

18. Composition for producing an electrically conductive layer according to a slotted-nozzle method according to claim 16, wherein the composition comprises 5-15 wt. % polyacrylate.

19. Composition for producing an electrically conductive layer according to a slotted-nozzle method according to claim 1, wherein the composition comprises 5-15 wt. % polyacrylate.

* * * * *